UNITED STATES PATENT OFFICE.

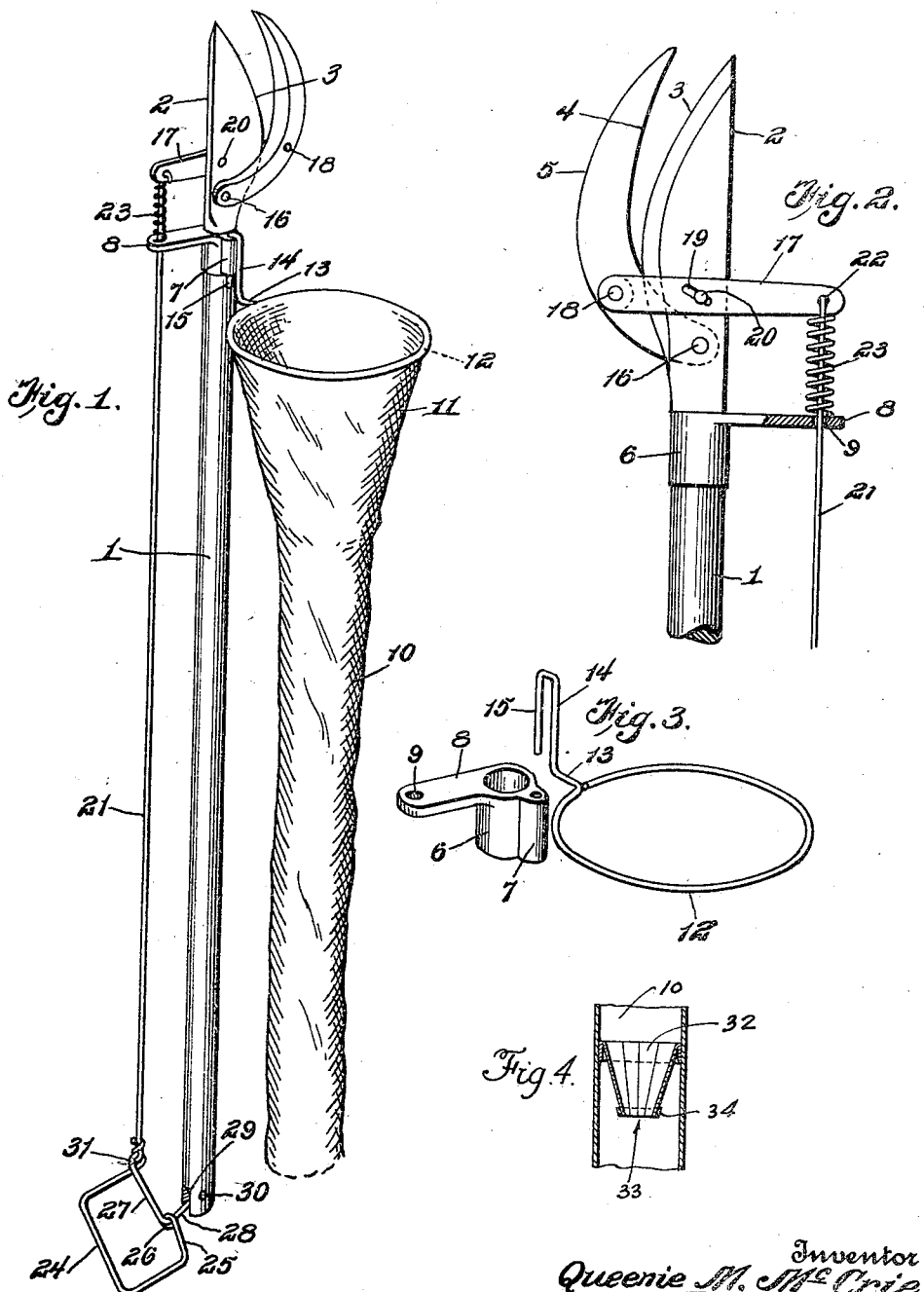

QUEENIE McCRIE, DECEASED, LATE OF SARNIA, ONTARIO, CANADA, BY WILLIAM McCRIE, ADMINISTRATOR, OF SARNIA, CANADA, ASSIGNOR OF ONE-HALF TO MAY McCRIE, OF SARNIA, ONTARIO, CANADA, AND ONE-HALF TO WILLIAM O. SHEETS, OF CLIVALE, ALBERTA, CANADA.

FRUIT-PICKER.

1,373,898.  Specification of Letters Patent.  Patented Apr. 5, 1921.

Application filed October 4, 1919. Serial No. 328,572.

*To all whom it may concern:*

Be it known that QUEENIE McCRIE, deceased, late a subject of the King of Great Britain, and resident of Sarnia, in the county of Lambton, Province of Ontario, Dominion of Canada, did invent new and useful Improvements in Fruit-Pickers, of which the following is a specification.

This invention relates to fruit pickers, and one of its objects is to provide a fruit picker which is simple and inexpensive in construction and adapted to be readily and conveniently operated.

Another object of the invention is to provide a fruit picker which embodies novel and improved features whereby increased efficiency is secured.

The invention consists of the features of construction, combination and arrangement of parts hereinafter fully described and claimed, reference being had to the accompanying drawing, in which:—

Figure 1 is a perspective view of a fruit picker embodying the invention.

Fig. 2 is a detail side elevation of the cutting mechanism thereof.

Fig. 3 is a perspective view of the ferrule and frame ring.

Fig. 4 is a fragmentary longitudinal section of the lower end of the sack showing the valved outlet partition therein.

Referring to the drawing, 1 designates a staff or handle, made of wood or other suitable material and of any suitable diameter and length. The upper end of this staff is suitably formed to receive a tang or shank upon a fixed cutting blade 2 having an arcuate cutting edge 3 for coöperation with the cutting edge 4 of a movable blade 5.

A metallic ferrule 6 encircles the upper end of the staff for the purpose of strengthening and reinforcing the same and serving as a support for certain parts of the apparatus. This ferrule 6 is provided at one side with a vertically disposed eye 7 and is provided at an opposite side with an angularly projecting guide arm 8 having a guide aperture 9 therein.

The eye 7 is designed to receive and support a gathering sack 10 having a flaring or expanded mouth portion 11 provided with an inclosed frame rim 12. This rim 12 is of annular or ring form and preferably made of wire, one end of which is bent outwardly to form a radial arm 13, upwardly to form a bracing arm 14 and downwardly in parallel relation to the arm 14 to provide therewith a supporting hook 15. The parts 14 and 15 provide a member of U-form, the hook portion 15 of which is engageable with the eye 7 to detachably support the sack from the ferrule, the arm 14 lying in contact with the outer surface of the eye to brace and reinforce the connection, while the arm 13 suitably spaces the mouth of the sack from the staff 1.

The movable cutting blade 5 is pivotally connected, as at 16, with the fixed cutting blade 2 and is also pivotally connected with one end of an actuating lever 17, as indicated at 18. This lever 17 is slidably and pivotally connected with the fixed blade 2, as by providing said lever with a diagonal slot 19 receiving a headed pin or stud 20 on the fixed blade, allowing the lever 17 to swing vertically and at the same time move transversely across the blade 2 to secure an efficient cutting action of the blade 5.

Extending through the guide opening 9 in the guide arm 8 is a connecting rod 21. The upper end of this rod is pivotally connected with the free end of the lever 17, as indicated at 22, and a coiled spring 23 encircles the rod between the free end of the lever and the arm 8 and exerts its expansive energy to move such arm of the lever upwardly for the purpose of normally holding the movable blade 5 in retracted position and restoring it to such position after cutting actuation.

The lower end of the connecting rod 21 is coupled to an actuating crank 24 of novel construction, said crank being preferably made of wire bent into the form of an oblong rectangular loop. The ends of the wire are arranged for connection at one side of the loop, and one end 25 thereof is formed with a terminal eye 26, through which passes the other end 27 of the wire, which is extended laterally to form a crank arm 28, said crank arm being movable in a slot or bifurcation 29 formed in the lower end of the staff 1 and pivotally connected with a pin 30 extending across said bifurcation.

The arm 27, at its point of connection with one end of the loop crank 24, is formed to provide an eye 31 which pivotally engages the lower end of the rod 21, whereby through reverse rocking movements of the crank 24 the rod 21 may be reciprocated and the movable cutting blade 5 actuated in an obvious manner. It will be observed that such construction of the crank 24 permits it to be held easily and conveniently in the hand of the operator without fatigue, and allows the operator through easy and natural rocking movements of the wrist to effect the actuation of the movable cutting blade.

I preferably provide within the lower end of the sack 10 adjacent to the outlet thereof, a conical valve or buffer partition 32, made of fabric or other suitable material. This buffer partition is provided at its apex with an opening 33, which is preferably fluted or gathered, and is normally held in such condition by the elastic band 34, so that it will form a stop to check the fruit on its fall by gravity and prevent the fruit from becoming bruised or injured. It will be understood that the fruit falling will distend the partition and expand the elastic outlet so that it will pass therethrough, allowing it to discharge easily and without injury.

It will be evident from the foregoing description that the invention provides a fruit picker which may be made light in weight, which is simple of construction and may be inexpensively manufactured and sold, and which in addition is free from complicated parts and embodies a construction of operating elements insuring ease and convenience in the actuation of the cutting mechanism.

Having thus fully described my invention, I claim:—

1. In a fruit picker, the combination including a staff and a gathering receptacle coextensive therewith, of a fixed cutter blade projecting from the upper end of the staff and in line therewith, a ferrule engaged over the upper end of the staff and securing said fixed cutter blade in position thereon, a movable cutter blade pivotally supported on said fixed cutter blade, a guide pin mounted on said fixed cutter blade and in engagement with a guide slot formed in said actuating lever, a guide arm projecting radially of said ferrule, an operating rod coextensive with the staff and movable in said guide arm and connecting said actuating lever, a spring associated with said operating rod between said actuating lever and said guide arm and normally tensioning said actuating lever to hold the movable cutter blade in operative position with respect to said fixed cutter blade, and an operating crank pivoted at the lower end of the staff and connecting said operating rod.

2. In a fruit picker, the combination including a staff and a gathering receptacle coextensive therewith, of a fixed cutter blade projecting from the upper end of the staff and in line therewith, a ferrule engaged over the upper end of the staff and securing said fixed cutter blade in position thereon, a movable cutter blade pivotally supported on said fixed cutter blade and coöperative therewith, an actuating lever connecting said movable cutter blade and extending rearwardly therefrom, a guide arm extending radially of said ferrule and in line with said actuating lever, an operating rod coextensive with the staff and movable in said guide arm and connecting said actuating lever, a spring coiled around said operating rod between said guide arm and said actuating lever and normally tensioning the latter to hold the movable cutter blade in operative position, and an operating crank pivoted at the lower end of the staff, said operating crank being in the form of a substantially rectangular loop to provide a handle portion and connecting said operating rod at one corner of the loop.

In testimony whereof I affix my signature.

WILLIAM McCRIE,
*Administrator of Queenie McCrie, deceased.*